United States Patent
Dunning et al.

(10) Patent No.: US 6,765,465 B2
(45) Date of Patent: Jul. 20, 2004

(54) MAGNETIC CLAMPING ARRANGEMENT

(75) Inventors: Kenneth Dunning, High Peak (GB); Ronald Ian Cotterill, High Peak (GB); David Michael Lomas, Stockport (GB)

(73) Assignee: Federal-Mogul Friction Prouducts Limited, Manchester (GB)

( * ) Notice: Subject to any disclaimer, the term of this patent is extended or adjusted under 35 U.S.C. 154(b) by 0 days.

(21) Appl. No.: 10/344,174

(22) PCT Filed: Jul. 31, 2001

(86) PCT No.: PCT/GB01/03448

§ 371 (c)(1),
(2), (4) Date: Feb. 6, 2003

(87) PCT Pub. No.: WO02/11951

PCT Pub. Date: Feb. 14, 2002

(65) Prior Publication Data

US 2004/0061585 A1 Apr. 1, 2004

(30) Foreign Application Priority Data

Aug. 7, 2000 (GB) .............................. 0019293

(51) Int. Cl.$^7$ ............................... H01F 7/20
(52) U.S. Cl. ........................ 335/285; 335/289; 335/296
(58) Field of Search .................. 335/285–298

(56) References Cited

U.S. PATENT DOCUMENTS 3,363,209 A * 1/1968 Pevar ......................... 335/286
4,652,845 A 3/1987 Finkle
4,840,417 A 6/1989 Izumi et al.
4,893,858 A 1/1990 Yoshitani et al.
5,630,634 A 5/1997 Stowe et al.

FOREIGN PATENT DOCUMENTS

| GB | 865502 | 4/1961 |
| GB | 1506730 | 4/1978 |
| GB | 2181897 A | 4/1987 |
| WO | WO 99 17072 | 4/1999 |

* cited by examiner

Primary Examiner—Ramon M. Barrera
(74) Attorney, Agent, or Firm—Reising, Ethington, Barnes, Kisselle, P.C.

(57) ABSTRACT

A magnetic clamping arrangement (10) for holding the arrangement, and in particular a body (5), operably clamped with respect to a ferromagnetic surface (6) by way of a body datum face (8), comprises housing (12) mounted on the body, and electromagnet (16) carried by the housing. The electromagnet comprises a core (18), having three limbs 20.1, 20.2 and 20.3, each terminating in a pole face 22.1, 22.2 and 22.3, being formed by a plurality of ferromagnetic transformer laminations (26). stacked together and slideable with respect to each other in a direction to and from the pole faces. Lamination bias (36), in the form of masses 38, 40.1 and 40.2 of resilient compressible material, defined quiescent pole faces from which individual laminations may depart by sliding when forced against a surface having ridges and/or grooves extending in the lamination planes, but exerts a restoring force on such laminations so displaced. The pole faces are thus able to conform to such an uneven surface before the electromagnet is energised and attach with improved flux coupling thereafter.

12 Claims, 3 Drawing Sheets

MAGNETIC CLAMPING ARRANGEMENT

Figure 1A:
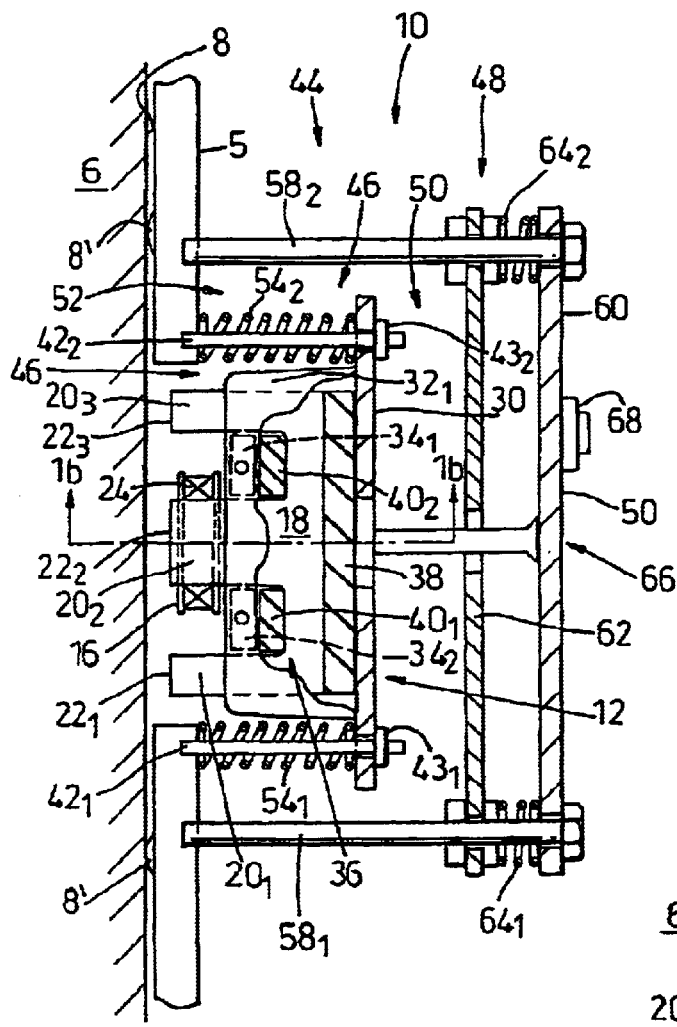

This invention relates to a magnetic clamping arrangement for holding the arrangement operably clamped with respect to a ferromagnetic surface and in particular relates to such clamping arrangement for releasably attaching a body with respect to a surface that is worn with small dimension imperfections, such as a pattern of grooves and/or ridges.

The invention is particularly applicable to the apparatus for measuring wear in the surface of a ferromagnetic rubbing member of a brake or like friction couple as described in WO99/17072.

Briefly, as a resume the above publication, wear and any wear pattern of a rubbing member, such as the ferromagnetic brake disc of a railway or like vehicle, is measured with the disc in situ on a wheel and in a vertical plane by periodically clamping to the disc surface a carrier of a scanning transducer probe that reciprocates along a predefined track and produces signals indicative of what wear has occurred.

To reposition the carrier member repeatedly with accuracy, indentations are made in the surface and the carrier aligned with these prior to being clamped to the surface by energising an electromagnet coupled to the carrier. The electromagnet supports the apparatus on such a vertical surface and is resiliently mounted to exert a bias on the carrier to ensure it remains located precisely.

Such a rubbing member is found to wear substantially uniformly in a so called coupled motion direction, that is, in the direction of relative motion between a friction material and the rubbing surface, or circumferentially of the disc, but to wear unevenly in a transverse, or radial, direction.

It has been found that in some such friction couples, the wear not only varies gradually across the rubbing surface, but also has superimposed thereon rapid changes in wear due primarily to the granular nature of the rubbing surface and/or friction material with its coarse mixture of materials of different hardness and abrasiveness, the rapid changes being of the form ridges or grooves and in the worst case, a succession thereof in the manner of a gramophone record.

In such circumstances it has been found difficult to guarantee a necessary degree of electromagnetic clamping between the electromagnet and the ferromagnetic surface due to the reduction in actual contact area between the magnet pole faces and the surface.

It will be appreciated that although this is a specific example of a situation wherein magnetic coupling is used to effect clamping of a carrier or other body to a ferromagnetic surface the need to clamp to such an uneven surface is not confined thereto, and without limiting the generality of the forgoing as to form and scale of unevenness, it is an object of the present invention to provide a magnetic clamping arrangement that is more able to accommodate local variation in surface profile without loss of efficacy than hitherto in a simple and cost effective manner.

According to the present invention a magnetic clamping arrangement for holding the arrangement operably clamped against a ferromagnetic surface comprises housing means supporting magnet means comprising a core having a plurality of limbs at least one of which comprises a plurality of elongate ferromagnetic elements, each having at least one dimension transversely to its length much smaller than its length, bundled together such that the ends of said elements define a pole face of the limb and are slidable with respect to each other in a direction to and from the pole face, to effect conforming abutment with a said ferromagnetic surface, flux generating means coupled to the core to cause a flux path between the pole faces and said ferromagnetic surface to effect an attachment force between the magnet means and surface, and element bias means, disposed between housing means and core, operable absent magnetic flux to define by the locus of the ends of the elements of each limb a quiescent pole face and exert a restoring force on elements of the bundle displaced away from the quiescent pole face, the arrangement being characterised by a body, having a datum face adapted to be disposed in overlying relationship with respect to said ferromagnetic surface, carrying the housing means movable with respect to the body in a direction to and from the datum face and attachment means, including resilient attachment bias means between the body and core arranged to bias the core elements towards a position in which the pole faces are recessed with respect to the body datum face, and attachment bias override means arranged to permit an override force to be exerted in opposition to the attachment bias to expose quiescent pole faces un-recessed with respect to the datum face for abutment with the ferromagnetic surface and in opposition to the element bias means to permit the elements in abutment with the ferromagnetic surface to conform thereto, the attachment bias means being operable, with the core pole faces attached to the ferromagnetic surface by said magnetic flux and absent said override force, to cause the datum face of the body to exert an abutting force against the ferromagnetic surface.

Such an arrangement permits individual core elements to be displaced relative to each other against the element bias in the quiescent state, that is, absent magnetic flux, to accommodate an uneven surface such that there is a greater area of intimate contact without air gaps. In the presence of the magnetic flux, forces exerted between adjacent elements of the bundle associated with any pole face effectively remove any tendency to be biassed back to the quiescent pole face locus.

The magnet may be of permanent magnet form but preferably is electromagnetic, including an electric coil surrounding at least part of the core.

The body may be disposed directly against the ferromagnetic surface or may overlie and clamp to the surface an intervening article which is shaped or apertured for the passage of the magnet means.

Conveniently, in such wear determining apparatus wherein the ferromagnetic surface is uneven due to parallel extending grooves and/or ridges, the elongate ferromagnetic elements comprise flat laminations, each lamination extending for the whole of one dimension of the pole face of which it forms part, that is, with said bundle of elements comprising a stack of the laminations.

Preferably, the core element bias means comprises a mass of compressible resilient material disposed between the housing means and the bundled elements and operable to exert a restoring force on any element displaced along its length from the quiescent pole face locus. Such element bias means may also form part of the attachment bias means in combination with a part extending between the body and housing.

The attachment means may comprise housing bias means between the body and housing and, depending upon disposition of the element bias means, part of the element bias means.

Figure 1B:
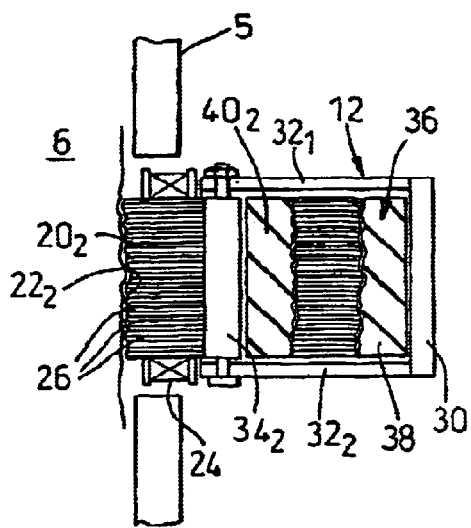
Figure 1C:
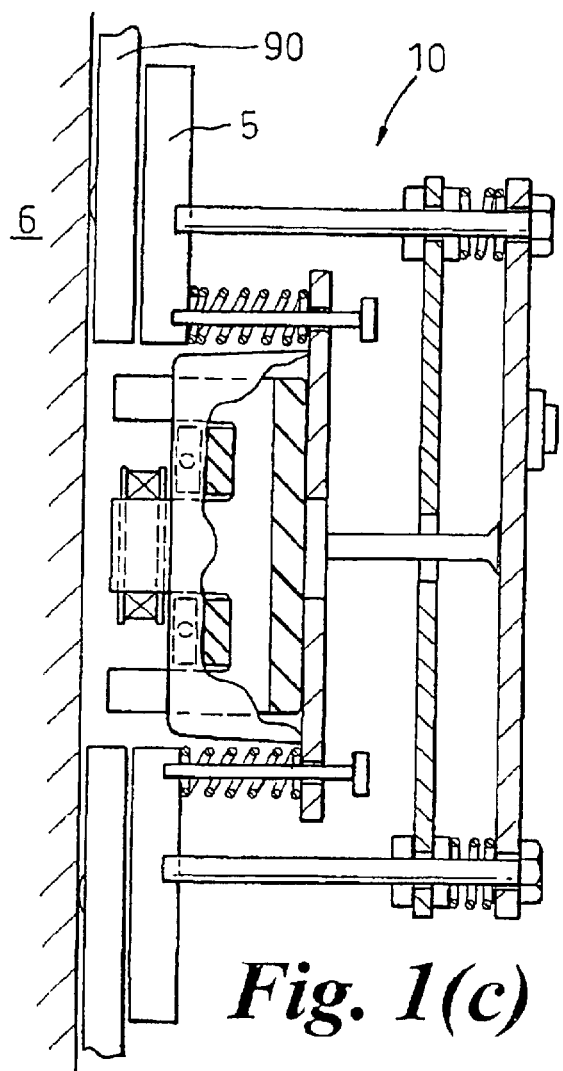

Embodiments of the invention will now be described by way of example with reference to the accompanying drawings, in which FIG. 1(a) is a sectional elevation through a first embodiment of magnetic clamping arrangement in accordance with the present invention, clamped directly against a ferromagnetic surface the magnet means being an electromagnet with a core of three limbs and including attachment means to ensure that with the magnet attached to the surface the body datum face is biassed towards the surface, FIG. 1(b) is a sectional elevation through the arrangement of FIG. 1(a) along the line 1b-1b thereof illustrating the relative disposition of the core laminations to conform with a ridged surface, FIG. 1(c) is a sectional elevation through the magnet clamping arrangement of FIGS. 1(a) and 1(b) illustrating it in operation overlying the surface of an intervening article and clamping the article to the ferromagnetic surface.

Figure 2:
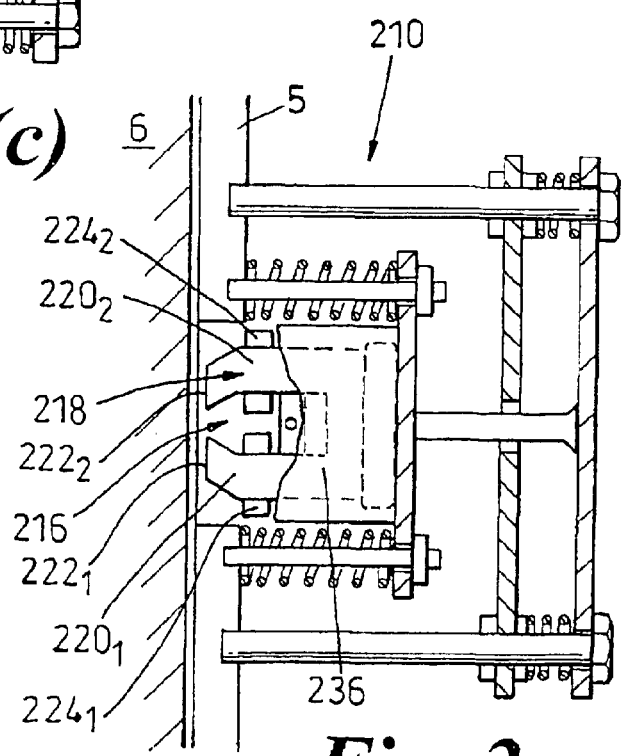
Figure 3:
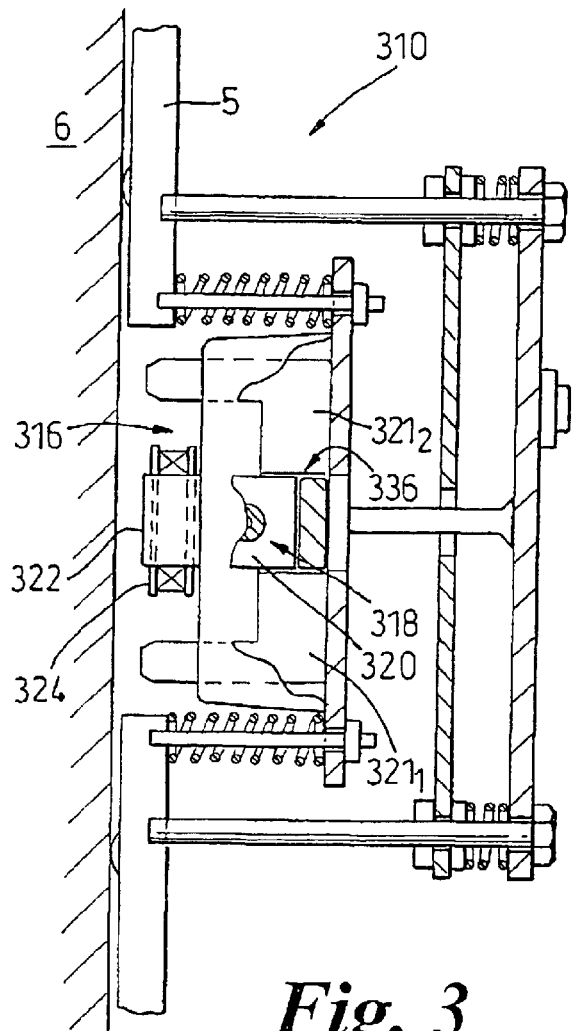
Figure 4:
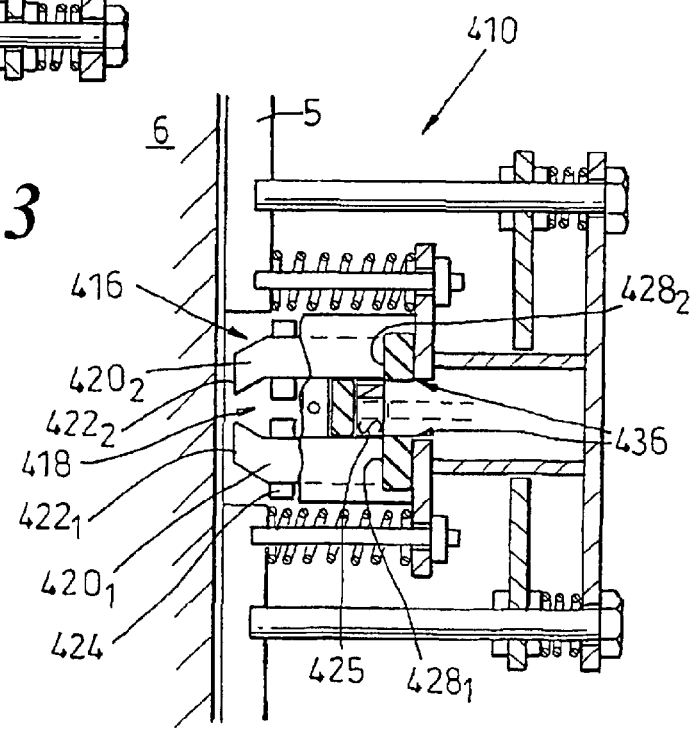

FIG. 2 is a schematic sectional elevation of part of a second embodiment of electromagnetic clamping arrangement, wherein the magnet core has two limbs with pole faces disposed more closely together, FIG. 3 is a schematic sectional elevation of part of a third embodiment of electromagnetic clamping arrangement wherein the magnet core has a single limb of relatively slidable, biassed laminations coupled to relatively fixed adjacent limbs, and FIG. 4 is a schematic sectional elevation through a fourth embodiment of electromagnetic clamping arrangement in accordance with the present invention, in which the flux is created in the core by permanent magnet physically removable, or otherwise rendered ineffective, to create or interrupt clamping flux.

Referring to FIGS. 1(a) and 1(b), apparatus, such as the wear determining arrangement of the aforementioned publication, includes a body 5 which it is desired to releasably clamp to a ferromagnetic surface 6 of a brake disc, which surface has a wear pattern that includes local variations in surface level as elongate ridges and/or grooves such that a datum face 8, which may be flat or as represented here by the locus of a plurality of projection points 8', is forced against the surface.

A magnetic clamping arrangement 10 in accordance with the present invention includes a body, comprising the body 5, and housing means 12 carried thereby. It further comprises magnet means 16, carried by the housing, being an electromagnet comprising a core 18 housing three limbs $20_1$, $20_2$ and $20_3$ each extending towards the datum face 8 and terminating in a pole face $22_1$, $22_2$ and $22_3$ respectively, and Magnetic flux generating means in the form of electromagnet coil 24 surrounding a limb 202 of the core.

Each limb of the core is formed by a bundle of elements 26 each having one dimension transversely to the direction of limb length that is much smaller than the length, in this embodiment being a stack of E-shaped laminations of the type employed in transformers, such that the three limbs $20_1$–$20_3$ are provided integrally in each lamination of the stack and the laminations at the ends of the limbs define the respective pole faces $22_1$, $22_2$ and $22_3$.

The laminations 26 are stacked in said transverse direction such that individual laminations are slidable with respect to each other in said limb length direction, that is, to and from the datum face, at least in a quiescent state in which there is no magnetic flux in the core that exerts force between laminations to prevent sliding.

The housing means 12 comprises housing member 30, enclosing members $32_1$ and $32_2$ which confine the laminations in the stack in said slidable relationship, and supporting members $34_1$ and $34_2$ which extend between the enclosing members through the spaces between the limbs.

The core 18, that is, the lamination stack, is disposed with respect to the housing means by element bias means, indicated generally at 36, taking the form of a mass or block 38 of compressible resilient material, such as rubber, disposed between the housing member 30 and the ends of the stacked laminations remote from the pole faces, and masses $40_1$ and $40_2$ disposed between the limbs and support members $34_1$, and $34_2$, also remote from the pole faces.

The laminations of the core are thus supported sandwiched by the compressible resilient material which defines for each limb, by the locus of the ends of the laminations thereof, a quiescent pole face. Relative sliding between the laminations in a direction to and from the pole faces is resisted, but not prevented, by the element bias means which exerts a restoring force thereon.

Clearly all of the laminations, that is the stack itself, may also undertake limited motion relative to the housing means under the influence of the restoring bias, or put another way, the whole core is resiliently mounted with respect to the housing means.

In order to achieve the objective of holding the body 5 clamped against the ferromagnetic surface by way of the datum face, the housing means 12 is carried by the body and movable with respect thereto in a direction to and from the datum face by spacer studs located one at each corner of the housing member 30, only two of which are shown at $42_1$ and $42_2$. The spacer studs are of such length, limited by stops $43_1$ and $43_2$, that the housing means can move from the body datum face by an amount that causes the pole faces of the magnet core to be recessed with respect to the datum face.

Attachment means, indicated generally at 44, includes resilient attachment bias means 46 between the body and magnet core, and attachment bias override means 48. The attachment means 44 further includes handle means 50 which facilitates disposing of the body and remainder of the arrangement in overlying relationship with the ferromagnetic surface and also forms part of the attachment bias override means 48, as described below.

The attachment bias means 46 comprises housing bias means 52 between the body and housing means, conveniently in the form of housing bias springs $54_1$ and $54_2$ on the spacer studs $42_1$ and $42_2$, respectively, and the parts $40_1$ and $40_2$ of the element bias means, the combined effect being to bias the magnet means away from the datum surface towards a position, as shown, in which the quiescent pole faces $20_1$, $20_2$ and $20_3$ are actually recessed with respect to the body datum face 8.

The handle means 50 comprises stand-off studs $58_1$, $58_2$ carried by the body 5 and transverse bars 60 and 62 which overlie the housing means. The bar 62 is fixed in position relative to the body and the bar 60 is displaceable with respect to the bar along the studs $58_1$, and $58_2$, being biassed away from it by stud springs $64_1$, and $64_2$. The handle means, in its simplest function, permits the body to be placed in a desired overlying relationship with respect to the ferromagnetic surface.

Insofar as the attachment bias means tends to recess the magnetic pole faces with respect to the datum face, it is necessary for the attachment means to include the above-mentioned attachment bias override means 48 to permit an override force to be exerted on the core element in opposition to the attachment bias, firstly to expose the quiescent pole faces unrecessed for abutment with the ferromagnetic surface and secondly to effect conformity therewith against the element bias prior to the creation of the magnetic flux that effects clamping.

The attachment override means is provided by the handle means 50. Whilst the bar 62 is fixed with respect to the body, and comprises a first operative part of the handle means, the bar 60 also has an actuating rod 66 extending therefrom towards the housing means and comprises a second operative part of the handle means, contacting the housing member 30 and/or contacting the rubber mass 38 by way of an aperture in the housing member to permit the core pole faces to be urged against the ferromagnetic surface by overcoming the attachment bias.

Conveniently, but not of necessity, switch 68 is provided on the handle means to permit an operative to switch current to the coil 24 on or off whilst holding the body by way of the clamping arrangement handle.

In use, the body is supported by an operative grasping the handle and moving the datum face 8 into abutment with the ferromagnetic surface at a position desired of it and oriented with respect thereto so that the laminations of the electromagnetic core each extend in a direction parallel to any groove and/or ridge extending along the surface.

The pole faces of the electromagnet are at this time recessed with respect to the datum, face and thus out of contact with the surface.

The operative then operates the override means manually by drawing the bars 60 and 62 of the handle means together, thereby exerting a force directly or indirectly on the lamination bias means which overrides the effect of housing bias springs $54_1$ and $54_2$ and moves the quiescent pole faces of the laminated core from recession relative to the datum face such that they are able to abut the ferromagnetic surface, and forces the quiescent pole faces into abutment with the ferromagnetic surface in opposition to the element bias means for individual laminations to become juxtaposed with respect to each other such that each pole face conforms to the surface, as illustrated in FIG. 1(b).

The operative, by way of switch 68 or otherwise, causes a current to flow in the coil 24 and magnetic flux in the core which attracts it to, and maintains it clamped to, the ferromagnetic surface 6.

Thereafter the operative releases the handle means, permitting the housing bias springs $54_1$ and $54_2$ to exert a force between the housing and body in such a sense as to attempt to pull the electromagnet from contact with the ferromagnetic surface and push the body into contact with the surface. Insofar as the conforming pole faces provide a relatively large contact area with few air gaps to weaken the coupling, and the element bias means couples individual elements to the housing means, the load is substantially uniformly spread and the body is supported on the surface and biassed against it.

To remove the body, the operative, whilst supporting the body and preferably by way of handle bars 60 and 62, breaks the flow of current in coil 24. The housing bias springs $54_1$ and $54_2$ thus pull the electromagnet out of contact with the ferromagnetic surface, permitting the body and clamping arrangement to be lifted away from the surface as the element bias means effects alignment of the core laminations to the quiescent, uniform pole faces.

It will be appreciated that variations may be made to such items as the various forms of bias means, for example using discrete springs and resilient compressible materials in roles other than shown in FIGS. 1(a) and (b), to the attached bias override means and to the electromagnet means.

It will be appreciated that instead of overriding the attachment bias means manually by way of the handle means, it may be done by a motor or like transducer.

In the embodiment 10 of FIG. 1(a), the electromagnet core comprises substantially flat three-limbed laminations which are suitable when any groove and/or ridges in the ferromagnetic surface are substantially linear to the pole faces. If there is a consistent curvature to such grooves, that is they are arcs of a circle of large radius, then the laminations may be curved to a similar radius of curvature and stacked together.

To be less dependent upon the path of surface grooves or ridges, it may be desirable to have fewer pole faces and/or have them disposed physically closer.

Referring to FIG. 2, a combination of body 5 and electromagnetic clamping arrangement 210 is shown. This is generally similar to the arrangement 10 and will not be described in detail, corresponding parts being given corresponding reference numbers but with a leading '2' It differs however, in that the electromagnet 216 has a core 218 of laminations, each coupled to the housing means by element bias means 236, having two limbs $220_1$ and $220_2$, each of which supports a coil $224_1$ and $224_2$ respectively. The limbs also terminate in pole faces $222_1$ and $222_2$ which are offset towards each other such that they contact the ferromagnetic surface 6 over a smaller length in the direction of any grooves or ridges therein.

Referring to FIG. 3, this shows a similar view of a third embodiment of clamping arrangement 310 with body 5 against ferromagnetic surface 6. The electromagnet 316 has a core 318 comprising a single laminated limb 320 and two or more discrete, and possibly non-laminated, side limbs $321_1$ and $321_2$. The side limbs are fixed with respect to the body 5 and have pole faces of individually small area arrayed about the pole face 322 of the limb 320 which is of corresponding larger area and coupled to electromagnet core 324. The side limbs are in sliding contact with the limb 320 which is turn is supported by way of element bias means 336 which ensures that the larger area pole face is able to conform with surface grooves and/or ridges.

It will be appreciated that instead of being constructed of essentially planar laminations which are thin in only one direction transversely to limb length, such a single limb or two limb embodiment may constructed having limbs in the form of rods or pins, dimensionally limited in all transverse dimensions, whose ends define pole faces able to conform to a ferromagnetic surface having all forms of unevenness.

All of the above embodiments have been described with reference to an electromagnetic clamping arrangement. It will be appreciated that provided some means is implemented for introducing and discontinuing magnetic flux in the core, the flux can be derived from permanent magnet means.

Referring to FIG. 4, a clamping arrangement 410 comprises magnet means 416 having a core 418 in the form of two limbs $420_1$ and $420_2$ formed of stacked laminations defining pole faces $422_1$ and $422_2$ respectively. At the opposite ends thereof $428_1$ and $428_2$ they abut compressible, resilient element bias means 436. Between the limbs there is a location for a removable permanent magnet 425 which may be introduced to create clamping magnetic flux and removed or shaded to discontinue it. As a modification to such arrangement, the permanent magnet 425 may be permanently disposed, so that the presence to clamping flux is the normal state, and the magnet, or other parts of the core, be associated with a suitable electromagnet coil 424 which generates opposing and neutralising flux for the purpose of attachment and removal of the body. Such combination of permanent and electromagnets offers a failsafe clamping feature applicable to any of the other embodiments described.

It will be appreciated that in the above described embodiments, particularly those having a positive attachment bias, the body 5 may, instead of being biassed directly into contact with the ferromagnetic surface, be used to clamp an intervening article to the surface, provided the article is shaped or apertured for the passage of the magnet means, as illustrated in FIG. 1(c) in which article 90 is clamped between body 5 and ferromagnetic surface 6.

What is claimed is:

1. A magnetic clamping arrangement for holding the arrangement operably clamped against a ferromagnetic surface, the arrangement comprising:
    a body, having a datum face adapted to be disposed in overlying relationship with respect to said ferromagnetic surface,
    a magnet comprising: (i) a core having a plurality of limbs at least one of which comprises a plurality of elongate ferromagnetic elements, each element having at least one dimension transversely to its length much smaller than its length, bundled together such that the ends of said elements define a pole face of the limb and are slidable with respect to each other in a direction to and from the pole face, to effect conforming abutment with a said ferromagnetic surface, and (ii) a magnetic flux generator coupled to the core to cause a flux path between the pole faces and said ferromagnetic surface to effect an attachment force between the magnet and surface,
    a magnet support housing, movable with respect to the body in a direction to and from the datum face,
    an element bias arrangement, disposed between said housing and core, operable absent magnetic flux to define by the locus of the ends of the elements of each limb a quiescent pole face and exert a restoring force on elements of the bundle displaced away from the quiescent pole face, and
    an attachment arrangement, including:
        (a) a resilient attachment bias arrangement between the body and core, arranged to bias the core elements towards a position in which the pole faces are recessed with respect to the body datum face, and
        (b) an attachment bias override arrangement arranged to permit an override force to be exerted in opposition to the attachment bias, to expose quiescent pole faces un-recessed with respect to the datum face for abutment with the ferromagnetic surface, and in opposition to the element bias arrangement to permit the elements in abutment with the ferromagnetic surface to conform thereto,
        the attachment bias arrangement being operable, with the core pole faces attached to the ferromagnetic surface by said magnetic flux and absent said override force, to cause the datum face of the body to exert an abutting force against the ferromagnetic surface.

2. A clamping arrangement as claimed in claim 1 wherein the elongate ferromagnetic elements comprise flat laminations, each lamination extending for the whole of one dimension of the pole face of which it forms part.

3. A clamping arrangement as claimed in claim 2 wherein each lamination forms an element of all of the limbs of the core.

4. A clamping arrangement as claimed in claim 3 wherein each lamination is E-shaped with three limbs defining two pairs of pole faces.

5. A clamping arrangement as claimed in claim 2 in which the flat laminations comprise transformer core laminations.

6. A clamping arrangement as claimed in claim 1 in which the element bias arrangement comprises a mass of compressible resilient material disposed between the housing and the bundled elements remote from the pole faces and operable to exert a restoring force on any element displaced along its length from the quiescent pole face locus.

7. A clamping arrangement as claimed in claim 6 in which the element bias arrangement is affixed to both the bundle of elements and the housing and operable in both extension and compression.

8. A clamping arrangement as claimed in claim 1 wherein the attachment bias arrangement comprises a housing bias arrangement between the body and the housing and said element bias arrangement between the housing and the core.

9. A clamping arrangement as claimed in claim 8 wherein the housing bias arrangement comprises at least one spring extending between the body and the housing.

10. A clamping arrangement as claimed in claim 1 wherein the attachment arrangement has a handle arranged to facilitate disposition of the body in overlying relationship with a said ferromagnetic surface and the pole faces to be urged against the surface.

11. A clamping arrangement as claimed in claim 10 wherein the attachment bias arrangement comprises a housing bias arrangement between the body and the housing and said element bias arrangement between the housing and the core, and wherein the attachment bias override arrangement comprises a first part of said handle fixed with respect to the body and a second part of said handle coupled to the housing.

12. A clamping arrangement as claimed in claim 10 wherein the flux generator comprises at least one electrical coil surrounding at least part of the core.

* * * * *

UNITED STATES PATENT AND TRADEMARK OFFICE
CERTIFICATE OF CORRECTION

PATENT NO. : 6,765,465 B2
DATED : July 20, 2004
INVENTOR(S) : Kenneth Dunning, Ronald Ian Cotterill and David Michael Lomas It is certified that error appears in the above-identified patent and that said Letters Patent is hereby corrected as shown below:

Title page,
Item [73], Assignee, delete "Prouducts" and insert therein -- Products --.
Item [57], ABSTRACT, after "(26)", delete "." and insert -- , --.

Column 1,
Line 65, after "abutment with" delete "a".

Column 3,
Line 44, after "and" delete "Magnetic" and insert -- magnetic --.
Line 45, after "limb" delete "202" and insert --  --.

Column 6,
Line 11, after "leading" delete "'2'" and insert -- "2" --.
Line 30, after "which" delete "is" and insert -- in --.
Line 36, after "may" insert -- be --.

Column 8,
Line 18, after "abutment with" delete "a".
Line 35, after "relationship with" delete "a".

Signed and Sealed this

Ninth Day of August, 2005

JON W. DUDAS
*Director of the United States Patent and Trademark Office*